US012019971B2

(12) United States Patent
Chuang et al.

(10) Patent No.: US 12,019,971 B2
(45) Date of Patent: *Jun. 25, 2024

(54) STATIC VOLTAGE DROP (SIR) VIOLATION PREDICTION SYSTEMS AND METHODS

(71) Applicant: Taiwan Semiconductor Manufacturing Co., Ltd., Hsinchu (TW)

(72) Inventors: Yi-Lin Chuang, Hsinchu (TW); Szu-ju Huang, Hsinchu (TW); Shih-Yao Lin, Hsinchu (TW); Shih Feng Hung, Hsinchu (TW); Yin-An Chen, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,056

(22) Filed: Mar. 13, 2023

(65) Prior Publication Data

US 2023/0214575 A1    Jul. 6, 2023

Related U.S. Application Data

(63) Continuation of application No. 17/397,458, filed on Aug. 9, 2021, now Pat. No. 11,604,917, which is a
(Continued)

(51) Int. Cl.
*G06F 30/398* (2020.01)
*G06F 30/327* (2020.01)
*G06F 30/3315* (2020.01)
*G06F 30/394* (2020.01)
*G06F 30/396* (2020.01)
*G06N 5/04* (2023.01)
(Continued)

(52) U.S. Cl.
CPC .......... *G06F 30/398* (2020.01); *G06F 30/327* (2020.01); *G06F 30/394* (2020.01); *G06N 5/04* (2013.01); *G06N 20/00* (2019.01); *G06F 30/3315* (2020.01); *G06F 30/396* (2020.01); *G06F 2119/12* (2020.01)

(58) Field of Classification Search
CPC .. G06F 30/396; G06F 30/3315; G06F 30/398; G06F 30/394; G06F 30/327; G06F 2119/12
USPC ....... 716/104, 113, 108, 122, 115, 126, 134; 703/16
See application file for complete search history.

(56) References Cited

U.S. PATENT DOCUMENTS 10,810,346 B2    10/2020    Chuang et al.
10,956,645 B2    3/2021    Chung et al.
(Continued)

FOREIGN PATENT DOCUMENTS

KR    20150097624 A    8/2015

*Primary Examiner* — Phallaka Kik
(74) *Attorney, Agent, or Firm* — Seed IP Law Group

(57) ABSTRACT

A violation prediction system includes machine learning circuitry trained based on past data to predict the presence of violations in electronic device designs after routing has been performed. The machine learning circuitry configured to predict, based on the past data and a pre-routing layout of an electronic device design, whether one or more violations would be present in in the electronic device design due to routing of the layout.

20 Claims, 8 Drawing Sheets

Related U.S. Application Data continuation of application No. 17/027,370, filed on Sep. 21, 2020, now Pat. No. 11,087,066, which is a continuation of application No. 16/429,592, filed on Jun. 3, 2019, now Pat. No. 10,810,346.

(60) Provisional application No. 62/738,161, filed on Sep. 28, 2018.

(51) Int. Cl.
*G06N 20/00* (2019.01)
*G06F 119/12* (2020.01)

(56) References Cited

U.S. PATENT DOCUMENTS

| | | | |
|---|---|---|---|
| 11,042,806 B1 * | 6/2021 | Jiang | G06F 30/398 |
| 11,087,066 B2 | 8/2021 | Chuang et al. | |
| 11,210,444 B1 | 12/2021 | Chang et al. | |
| 11,250,196 B2 | 2/2022 | Shurygin et al. | |
| 11,333,707 B2 | 5/2022 | Agarwal et al. | |
| 11,604,917 B2 * | 3/2023 | Chuang | G06F 30/394 |
| 11,816,417 B2 * | 11/2023 | Chuang | G06F 30/398 |
| 2005/0138588 A1 | 6/2005 | Frenkil | |
| 2005/0204316 A1 | 9/2005 | Nebel et al. | |
| 2008/0098335 A1 | 4/2008 | Allen et al. | |
| 2009/0031264 A1 | 1/2009 | Rittman et al. | |
| 2010/0211839 A1 | 8/2010 | Almukhaizim et al. | |
| 2014/0351781 A1 | 11/2014 | Rozen et al. | |
| 2015/0212152 A1 | 7/2015 | Agarwal et al. | |
| 2017/0046458 A1 | 2/2017 | Meagher et al. | |
| 2017/0116367 A1 | 4/2017 | Bickford et al. | |
| 2017/0147727 A1 | 5/2017 | Bickford et al. | |
| 2018/0144086 A1 | 5/2018 | Chung et al. | |
| 2020/0104457 A1 * | 4/2020 | Chuang | G06F 30/327 |
| 2020/0132763 A1 | 4/2020 | Agarwal et al. | |
| 2021/0004519 A1 * | 1/2021 | Chuang | G06F 30/398 |
| 2021/0247839 A1 | 8/2021 | Pathak et al. | |
| 2023/0042873 A1 * | 2/2023 | Sreenivasan | G06F 30/396 |
| 2023/0385520 A1 * | 11/2023 | Chuang | G06F 30/327 |
| 2023/0385521 A1 * | 11/2023 | Chuang | G06N 20/00 |

* cited by examiner

STATIC VOLTAGE DROP (SIR) VIOLATION PREDICTION SYSTEMS AND METHODS

BACKGROUND

In an electronic circuit design process, one or more electronic design automation (EDA) tools may be utilized to design, optimize, and verify semiconductor device designs, such as circuit designs in a semiconductor chip. A register-transfer level (RTL) design of a circuit may be performed, for example, by software tools which utilize a high-level software length (e.g., Verilog, or the like) to describe or otherwise model the circuit. The RTL design may then proceed to a synthesis process, in which the RTL design may be translated to an equivalent hardware or circuit-level implementation file. The synthesis results may then be used by placement and routing tools to create a physical layout of the semiconductor device (e.g., a semiconductor chip). During placement, a placer tool may produce a placement layout based on the synthesized circuit design. The placement layout includes information indicating physical positions of various circuit elements of the semiconductor device. After the placement of the device is completed, clock tree synthesis (CTS) may be performed, in which a clock tree is developed to distribute (e.g., by electrical networks) clock signals from a common point to all of the circuit elements that are to receive a clock signal.

Routing is typically performed after CTS. During routing, wires or interconnections may be formed to connect the various circuit elements of the placement layout. After routing, a physical verification process may be performed on the semiconductor device, and then a voltage drop analysis may be performed. The voltage drop analysis may be referred to as an IREM analysis. During the IREM analysis, the semiconductor device is analyzed to determine whether static voltage drops (SIR drops) are present which exceed or otherwise violate design rules. The SIR drops of a semiconductor device are due, at least in part, to the actual wirings or interconnections between various circuit elements or nodes in the device, and thus, SIR drop analysis is generally performed after routing of the device.

BRIEF DESCRIPTION OF THE SEVERAL VIEWS OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
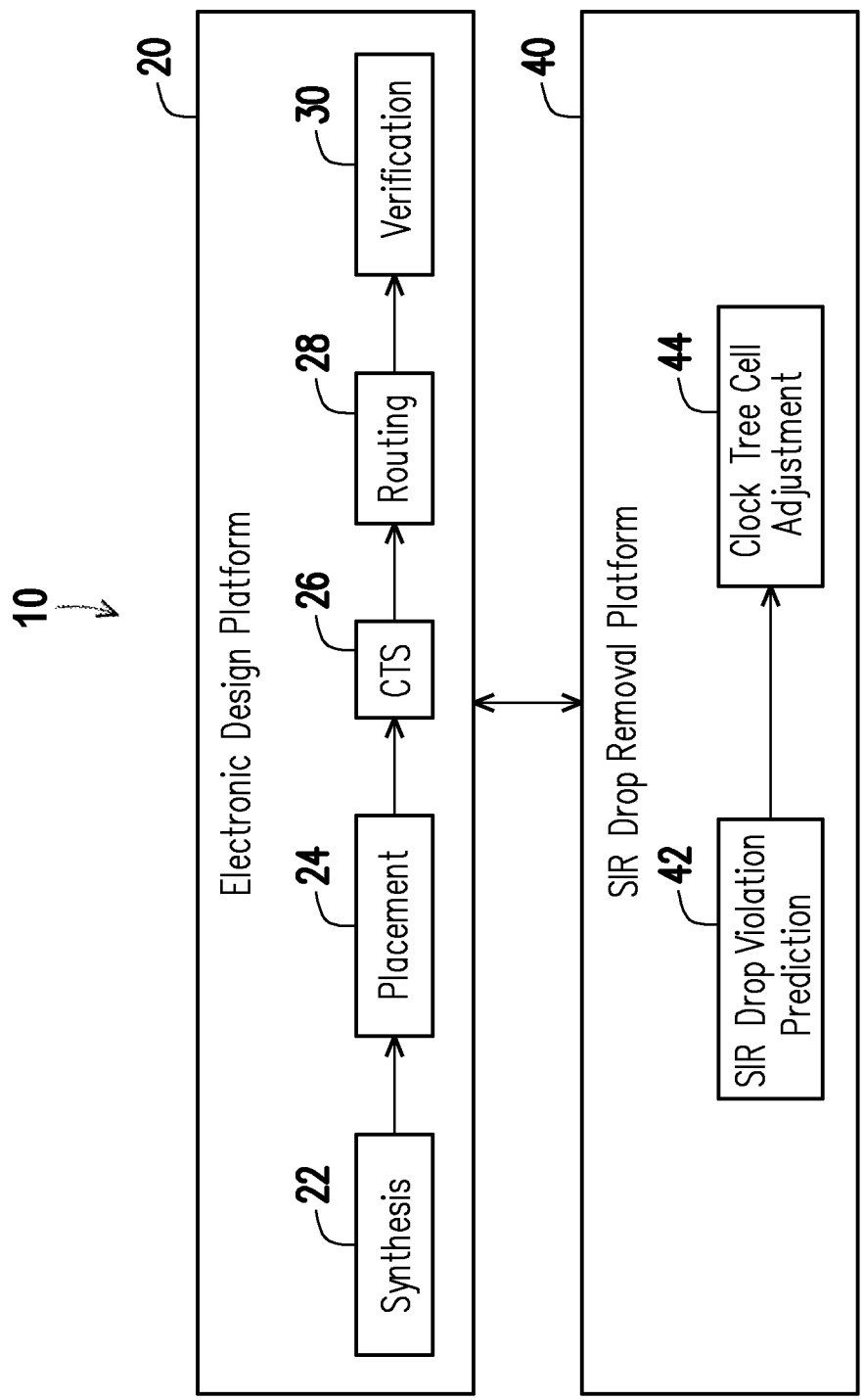
FIG. 1 is a block diagram illustrating an electronic device design system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments provided herein include SIR drop violation prediction systems and methods for predicting SIR drop violations in a CTS layout before routing is performed on the CTS layout. In some embodiments, machine learning techniques are utilized to create and/or modify a plurality of machine learning models, and SIR drop violation prediction circuitry may predict whether one or more SIR drop violations would be present in a particular CTS layout by comparing one or more regions of the CTS layout with the machine learning models.

In various embodiments, SIR drop violations due, at least in part, to routing of the device may be predicted before the routing is performed. In some embodiments, SIR violations are predicted for a semiconductor device design at or during the clock tree synthesis (CTS) stage.

FIG. 1 is a block diagram illustrating of an electronic device design system 10, in accordance with one or more embodiments of the present disclosure. The electronic device design system 10 is operable to generate and optimize placement layouts after clock tree synthesis has been performed (which may be referred to herein as a CTS design) for an electrical device before routing of the CTS layout. The electronic device design system 10 includes an electronic design platform 20 and a static voltage drop (SIR drop) removal platform 40. In some embodiments, the electronic design platform 20 and/or the SIR drop removal platform 40 may be implemented in hardware, firmware, software, or any combination thereof. For example, in some embodiments, the electronic design platform 20 and/or the SIR drop removal platform 40 may be at least partially implemented as instructions stored on a computer-readable storage medium, which may be read and executed by one or more computer processors or processing circuitry. The computer-readable storage medium may be, for example, read-only memory (ROM), random access memory (RAM), flash memory, hard disk drive, optical storage device, magnetic storage device, electrically erasable programmable read-only memory (EEPROM), organic storage media, or the like.

The electronic design platform 20 may include a plurality of electronic device design tools that may be implemented at least in part as software tools which, when executed by one or more computing devices, processors, or the like, can be utilized to design and generate one or more electronic device layouts, including placement layouts and associated routing for electronic devices circuits, which may include, for example, one or more integrated circuits (ICs).

In some embodiments, the electronic design platform 20 and the SIR drop removal platform 40 may be included in or otherwise implemented by a same apparatus, such as a same computing system or device. In other embodiments, the electronic design platform 20 and the SIR drop removal platform 40 may be included in or otherwise implemented by separate apparatuses, such as separate and remotely located computing systems or devices.

The electronic design platform 20 includes electronic device design tools which can be used, for example, to design high-level programming descriptions of analog and/or digital circuitry for an electronic device. In some embodiments, the high-level programming descriptions can be implemented using a high-level programming language, such as C, C++, LabVIEW, MATLAB, a general purpose system design or modeling language, such as SysML, SMDL and/or SSDL, or any other suitable high-level programming language. In some embodiments, the electronic design platform 20 may include various additional features and functionalities, including, for example, one or more tools suitable to simulate, analyze, and/or verify the high-level programming descriptions of circuitry for the electronic device In some embodiments, the electronic design platform 20 includes a synthesis tool 22, a placement tool 24, a clock tree synthesis (CTS) tool 26, and a routing tool 28, each of which may be implemented at least in part as software tools accessible to and executable by one or more computing devices, processors or the like.

The synthesis tool 22 translates one or more characteristics, parameters, or attributes of the electronic device into one or more logic operations, one or more arithmetic operations, one or more control operations, or the like, which may then be translated into the high-level programming descriptions in terms of the analog circuitry and/or the digital circuitry.

The placement tool 24 generates cells which correspond to, or otherwise implement, the one or more logic operations, one or more arithmetic operations, one or more control operations, or the like produced by the synthesis tool 22. The cells may include geometric shapes which correspond to various features of semiconductor devices, including, for example, diffusion layers, polysilicon layers, metal layers, and/or interconnections between layers.

In some embodiments, the geometric shapes for some of the analog circuitry and/or the digital circuitry can be defined in accordance with a standard cell from among a predefined library of standard cells associated with a technology library. The standard cell represents one or more semiconductor devices as well as their interconnection structures that are configured and arranged to provide a logical function, such as AND, OR, XOR, XNOR, or NOT, or a storage function, such as a flipflop or a latch. The predefined library of standard cells may be defined in terms of geometric shapes which correspond to diffusion layers, polysilicon layers, metal layers, and/or interconnections between layers. Thereafter, the placement tool 24 assigns locations for the geometric shapes on a printed circuit board (PCB) and/or a semiconductor substrate.

The CTS tool 26 performs clock tree synthesis (CTS) on a design generated, for example, by the placement tool 24. Clock tree synthesis generally refers to a process of synthesizing a clock tree to achieve zero or minimal skew and insertion delay, and includes inserting clock tree cells which correspond to, or otherwise implement, clock operations for the electronic device. The clock cells may include geometric shapes which correspond to circuitry or logical devices which implement clock features of semiconductor devices, including, for example, buffers, inverters, or the like. In some embodiments, each of the clock tree cells includes one or more buffers or inverters electrically positioned along clock paths of the electronic device design. Further, in some embodiments, one or more of the clock cells may include clock gating cells, such as integrated clock gating cells (ICGs). Clock gating is a common technique for reducing clock power by shutting off the clock to modules or circuit components by utilizing a clock enable signal, and such clock gating may be implemented using integrated clock gating cells. Integrated clock gating cells may include one or more logical circuit elements, such as an OR gate, an AND gate, or a latch.

The routing tool 28 produces physical interconnections between the cells or the geometric shapes in the layout provided by the placement tool 24, for example, after clock tree synthesis has been performed on the layout by the CTS tool 26. In some embodiments, the routing tool 28 utilizes a textual or an image-based netlist describing the analog circuitry, the digital circuitry, the technology library, a semiconductor foundry for fabricating the electronic device and/or a semiconductor technology node for fabricating the electronic device to assign the interconnections between the geometric shapes.

The electronic design platform 20 may include a variety of additional tools, including, for example, a verification tool 30. The verification tool 30 may perform various verifications or checks on an electronic device layout, e.g., after placement, CTS, and routing. For example, in some embodiments, the verification tool 30 can analyze the electronic device layout and can provide a static timing analysis (STA), a voltage drop analysis, also referred to an IREM analysis, a Clock Domain Crossing Verification (CDC check), a formal verification, also referred to as model checking, equivalence checking, or any other suitable analysis and/or verification. In some embodiments, the verification tool 30 can perform an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the like.

The verification tool 30 verifies that the electronic device design, including the layout of the cells or geometric shapes provided by the placement tool 24, the placement and function of the clock tree cells provided by the CTS tool 26, as well as the interconnections between the cells or geometric shapes provided by the routing tool 28, satisfies one or more specifications, rules, or the like associated with the electronic device design. The verification tool 30 may perform a physical verification, in which the verification tool 30 verifies whether an electronic device design is physically manufacturable, and that the resulting chips will meet the design specifications and will not have physical defects which prevent the chips from functioning as designed.

The verification tool 30 may perform a static voltage drop (SIR drop) analysis on the electronic device design. The SIR drop analysis may be performed, for example, as part of the IREM analysis performed by the verification tool 30. During the SIR drop analysis, the verification tool 30 analyzes the electronic device design, which may be a physical semiconductor device, to determine whether SIR drops are present which exceed or otherwise violate design rules or parameters which are specified for the electronic device design. Static IR drops generally refer to drops in VDD voltage level caused by the resistance of the metal wires in the power distribution grid which distribute power or voltage to various components within the electronic device design. The verification tool 30 may utilize any techniques, conventional or otherwise, to perform the SIR drop analysis, including, for example, applying electrical test vectors to the electronic device design and measuring or monitoring the voltage drops throughout the electronic device design. In some embodiments, the verification tool 30 may perform the SIR drop analysis through simulation, for example, using software tools which simulate application of voltages to the electronic device design and which measure or monitor the resulting SIR drops throughout the electronic device design.

In some embodiments, the verification tool 30 may generate a SIR drop map indicating values of static voltage drops throughout the electronic device design. In some embodiments, the verification tool 30 may generate a SIR drop map indicating locations of SIR drop violations (e.g., SIR drop values that exceed a predetermined threshold value) in the electronic device design. As will be discussed in further detail with respect to FIGS. 2 through 7, the known values and locations of SIR drop violations, as may be derived from the SIR drop map generated by the verification tool 30, for various different electronic device designs may be utilized as training data to train a machine learning model to predict or determine SIR drop values and/or SIR drop violations in new CTS layouts before routing has been performed.

In some embodiments, the SIR drop removal platform 40 is configured to predict or determine the presence of SIR drop violations in a particular electronic circuit layout, for example, as may be provided from the placement tool 24 and the CTS tool 26, prior to routing of the layout by the routing tool 28. As will be discussed in further detail herein, the SIR drop removal platform 40 may predict or determine the presence of SIR drop violations by implementing one or more machine learning approaches, for example, in which past data (such as data indicating presence and/or locations of SIR drop violations in electronic device designs after routing has been performed) is utilized to train a machine learning model to predict or determine the presence of SIR drop violations based on similarities or deviations between new electronic circuit placement layouts (e.g., before routing is performed) and the past data. In some embodiments, the SIR drop removal platform 40 may predict or determine the complete SIR drop map including values of SIR drops throughout the electronic circuit layout, and the SIR drop removal platform 40 may further predict or determine the locations of SIR drop violations based on the SIR drop map.

The SIR drop removal platform 40 may include a plurality of electronic device analysis and/or design tools which may be implemented at least in part as software tools which, when executed by one or more computing devices, processors, or the like, can be utilized to analyze one or more electronic device layouts, including placement layouts for electronic devices or circuits which may be received, for example, from the electronic design platform 20 (e.g., from the CTS tool 26). Additionally, in some embodiments, the SIR drop removal platform 40 may be utilized to adjust or otherwise provide information to the electronic design platform 20 which indicates one or more adjustments to be made to the placement and CTS layout in order to avoid or otherwise reduce the presence of SIR drop violations in the placement and CTS layout once the layout has been routed, for example, by the routing tool 28.

In some embodiments, the SIR drop removal platform 40 includes a SIR drop violation prediction tool 42, and a clock tree cell adjustment tool 44, each of which may be implemented at least in part as software tools accessible to and executable by one or more computing devices, processors or the like. In some embodiments, the SIR drop violation prediction tool 42 and/or the clock tree cell adjustment tool 44 may be implemented as circuitry operable to perform any of the functions described herein with respect to the SIR drop violation prediction tool 42 and/or the clock tree cell adjustment tool 44. In some embodiments, the electronic design platform 20 and the SIR drop removal platform 40 may be integrated, and may be implemented in a same platform. For example, each of the various tools described herein with respect to the electronic design platform 20 and the SIR drop removal platform 40 may be accessed or otherwise implemented, at least in part, by a same apparatus, such as a computer device.

In some embodiments, the SIR drop removal platform 40 receives placement layouts from the electronic design platform 20 after CTS is performed by the CTS tool 26, but before routing of the placement layouts is performed, for example, by the routing tool 28. The SIR drop removal platform 40 may implement a machine-learning approach to predict or determine the presence of SIR drop violations in the placement and CTS layouts, and to adjust or otherwise provide an indication of one or more recommended adjustments to the placement and CTS layout in order to optimize or improve an overall SIR drop behavior of the placement and CTS layout. For example, the SIR drop violation prediction tool 42 may receive the placement and CTS layouts from the electronic design platform 20 before routing is performed, and the SIR drop violation prediction tool 42 may implement a machine-learning approach to predict or determine the presence of SIR drop violations in the placement and CTS layouts, for example, based on past data which may be used to train a machine-learning circuit or circuitry to predict or determine the presence of SIR drop violations based on similarities or deviations between the past data (e.g., data indicative of SIR drop violations in electronic device designs after routing has been performed) and the received placement and CTS layouts. As will be described in further detail below, in some embodiments, the SIR drop violation prediction tool 42 may include machine learning circuitry 110 which may be trained to predict or determine the presence of SIR drop violations based on input training data 120 (e.g., past data which represents or indicates the presence and locations of SIR drop violations in electronic device designs after routing has been performed). The clock tree cell adjustment tool 44 may also receive the placement and CTS layouts and may further receive location or other data associated with the predicted or determined SIR drop violations from the SIR drop violation prediction tool 42. The clock tree cell adjustment tool 44 may adjust or recommend adjustments to the placement and CTS layout in order to optimize or improve the placement and CTS layout, based on the predicted or determined SIR drop violations.

Figure 2:
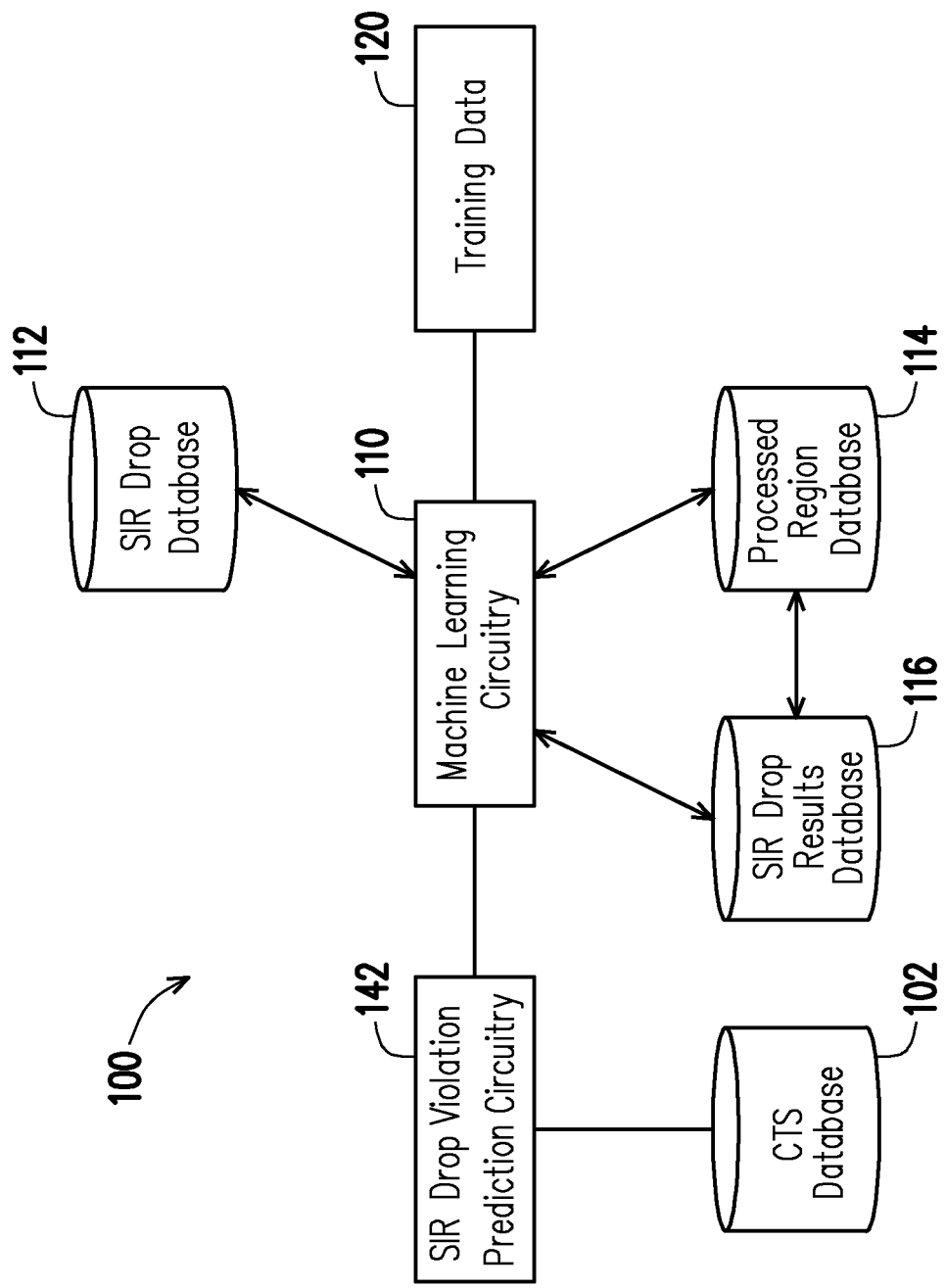
FIG. 2 is a block diagram illustrating a static voltage (SIR) drop violation prediction system, in accordance with some embodiments.

FIG. 2 is a block diagram illustrating a SIR drop violation prediction system 100, in accordance with embodiments of the present disclosure. The SIR drop violation prediction system 100 may be used in conjunction with, and may include one or more of the features and functionality of, the SIR drop removal platform 40 shown in FIG. 1. In some embodiments, the SIR drop violation prediction system 100 is included in or implemented by the SIR drop removal platform 40. For example, in some embodiments, the SIR drop violation prediction system 100 may be implemented or otherwise accessed by the SIR drop violation prediction tool 42 to predict or determine the presence of SIR drop violations in the placement and CTS layouts received, for example, from the placement tool 24 and the CTS tool 26 of the electronic design platform 20.

As shown in FIG. 2, the SIR drop violation prediction system 100 includes SIR drop violation prediction circuitry 142 and a CTS database 102. The SIR drop violation prediction circuitry 142 may include, or otherwise be executed by, a computer processor configured to perform the various functions and operations described herein. For example, the SIR drop violation prediction circuitry 142 may be executed by a computer processor selectively activated or reconfigured by a stored computer program, or may be a specially constructed computing platform for carrying out the features and operations described herein.

In some embodiments, the SIR drop violation prediction circuitry 142 includes memory which stores instructions for performing one or more of the features or operations described herein, and the SIR drop violation prediction circuitry 142 may be operable to execute instructions stored, for example, in the memory to perform the functions of the SIR drop violation prediction circuitry 142 described herein. The memory may be or include any computer-readable storage medium, including, for example, read-only memory (ROM), random access memory (RAM), flash memory, hard disk drive, optical storage device, magnetic storage device, electrically erasable programmable read-only memory (EEPROM), organic storage media, or the like.

The SIR drop violation prediction circuitry 142 may be communicatively coupled to the CTS database 102. The SIR drop violation prediction circuitry 142 may access CTS layouts from the CTS database 102. The term CTS layout is used herein to mean placement layouts after CTS has been performed, e.g., a CTS layout includes the cells generated by the placement tool 24 and further includes the clock tree cells generated by the CTS tool 26. The CTS layouts stored in the CTS database 102 may be provided, for example, from the CTS tool 26 of the electronic design platform 20. The CTS database 102 may be stored in one or more computer-readable memories.

The SIR drop violation prediction circuitry 142 analyzes a CTS layout retrieved from the CTS database 102 to predict or determine the presence of SIR drop violations in the CTS layout, for example, based on a comparison of the retrieved CTS layout with past data or analysis of the retrieved CTS layout by a machine learning model that is trained with past data indicative of SIR drop violations in electronic device designs after routing has been performed. In some embodiments, the SIR drop violation prediction circuitry 142 may separately inspect each of a plurality of regions of the CTS layout. The inspected regions of the CTS layout may have any size and/or shape. For example, and as described in further detail below with respect to FIG. 5, the CTS layout may be divided into regions based on a grid, and each cell or unit of the grid may have a size that corresponds to a size of each of the regions of the CTS layout.

The SIR drop violation prediction circuitry 142 may inspect each region of a CTS layout separately, region-by-region, and may predict or determine based on past data (e.g., training data that is utilized to train the machine learning circuitry 110), for each inspected region, whether SIR drop violations (as well as their locations) would be present in the inspected region, for example, after routing is performed on the CTS layout by a subsequent routing process.

In some embodiments, the SIR drop violation prediction circuitry 142 may predict or determine the presence and locations of SIR drop violations in the CTS layouts by employing one or more artificial intelligence or machine learning techniques, which in some embodiments may be implemented at least in part by the machine learning circuitry 110. Some or all of the determinations described herein that are made by the SIR drop violation prediction circuitry 142 may be performed automatically by the SIR drop violation prediction circuitry 142, for example, in response to receiving a CTS layout from the CTS database 102. The machine learning circuitry 110 may predict or determine the presence and locations of SIR drop violations in the CTS layouts by using past data (e.g., the machine learning circuitry 110 may be trained based on past data) which indicates the presence and locations of SIR drop violations in electronic device designs after routing has been performed, and the machine learning circuitry 110 may compare the received CTS layouts with the past data to predict or determine the presence of SIR drop violations based on similarities or deviations from the past data or from a trained model contained within, managed by, or otherwise accessible to the machine learning circuitry 110.

"Artificial intelligence" is used herein to broadly describe any computationally intelligent systems and methods that can learn knowledge (e.g., based on training data), and use such learned knowledge to adapt its approaches for solving one or more problems, for example, by making inferences based on a received input, such as the CTS layouts. Machine learning generally refers to a sub-field or category of artificial intelligence, and is used herein to broadly describe any algorithms, mathematical models, statistical models, or the like that are implemented in one or more computer systems or circuitry, such as processing circuitry, and which build one or more models based on sample data (or training data) in order to make predictions or decisions.

The SIR drop violation prediction circuitry 142 and/or the machine learning circuitry 110 may employ, for example, neural network, deep learning, convolutional neural network, Bayesian program learning, support vector machines, and pattern recognition techniques to solve problems such as predicting or determining the presence and locations of SIR drop violations in a placement layout. Further, the SIR drop violation prediction circuitry 142 and/or the machine learning circuitry 110 may implement any one or combination of the following computational algorithms and/or techniques: classification, regression, supervised learning, unsupervised learning, feature learning, clustering, decision trees, or the like.

As one example, an artificial neural network may be utilized by the SIR drop violation prediction circuitry 142 and/or the machine learning circuitry 110 to develop, train, and/or update one or more machine learning models which may be utilized to predict or determine the presence and locations of SIR drop violations in a CTS layout. An example artificial neural network may include a plurality of interconnected "neurons" which exchange information between each other. The connections have numeric weights that can be tuned based on experience, and thus neural networks are adaptive to inputs and are capable of learning. The "neurons" may be included in a plurality of separate layers which are connected to one another, such as an input layer, a hidden layer, and an output layer. The neural network may be trained by providing training data (e.g., past data which indicates the presence and locations of SIR drop violations in electronic device designs after routing has been performed) to the input layer. Through training, the neural network may generate and/or modify the hidden layer, which represents weighted connections mapping the training data provided at the input layer to known output information at the output layer (e.g., classification of an input electronic device design after routing has been performed as including SIR drop violations and their locations). Relationships between neurons of the input layer, hidden layer, and output layer, formed through the training process and which may include weight connection relationships, may be stored, for example, as one or more machine learning models within or otherwise accessible to the machine learning circuitry 110.

Once the neural network has been sufficiently trained, the neural network may be provided with non-training data (e.g., new CTS layout data prior to routing) at the input layer. Utilizing SIR drop violation knowledge (e.g., as stored in the machine learning model, and which may include, for example, weighted connection information between neurons of the neural network), the neural network may make determinations about the received CTS layout at the output layer. For example, the neural network may predict or determine the presence and locations of SIR drop violations in the CTS layout.

Employing one or more computationally intelligent and/or machine learning techniques, the SIR drop violation prediction circuitry 142 may learn (e.g., by developing and/or updating a machine learning algorithm or model based on training data) to predict or determine the presence and locations of SIR drop violations in a CTS layout, and in some embodiments, the SIR drop violation prediction circuitry 142 may make some predictions or determinations based at least in part on knowledge, inferences or the like developed or otherwise learned through training of the machine learning circuitry 110.

The machine learning circuitry 110 may be implemented in one or more processors having access to instructions, which may be stored in any computer-readable storage medium, which may be executed by the machine learning circuitry 110 to perform any of the operations or functions described herein.

In some embodiments, the machine learning circuitry 110 is communicatively coupled to a SIR drop database 112, which may be stored, for example, in any computer-readable storage medium. The SIR drop database 112 may include information that associates SIR drop values or SIR drop violations with one or more of a CTS layout (e.g., an entire CTS layout grid for an electronic device design), a CTS layout region (e.g., a plurality or grouping of neighboring grid cells or units), or a CTS layout sub-region (e.g., a single grid cell or unit). In some embodiments, the SIR drop database 112 includes information indicating a probability of one or more SIR drop violations in a particular CTS layout, CTS layout region, CTS layout sub-region, or the like. The SIR drop database may further include information associated with probabilities of particular SIR drop values in one or more CTS layouts, CTS layout regions, CTS layout sub-regions, or the like.

The information stored in the SIR drop database 112 may be derived from a plurality of electronic device designs, which may include the CTS layout (e.g., as provided by the placement tool 24 and the CTS tool 26), as well as the routing or interconnections between cells or geometric shapes and the clock cells of the placement and CTS layout (e.g., as provided by the routing tool 28). Thus, the information stored in the SIR drop database 112 may represent actual SIR drop values and actual SIR drop violations that have been determined to be present in actual electronic device designs, e.g., after routing has been performed.

In some embodiments, the machine learning circuitry 110 may be trained based on training data 120, which may be provided, for example, from the SIR drop database 112. The machine learning circuitry 110 may be trained, for example, by providing it with input training data 120 (e.g., past data which represents or indicates the presence and locations of SIR drop violations in electronic device designs after routing has been performed). For example, in some embodiments, the machine learning circuitry 110 may be trained based on information stored in the SIR drop database 112, which may represent SIR drop values or SIR drop violations that have been determined to be present in actual electronic device designs, and the algorithm or machine learning model contained within or accessible to the machine learning circuitry 110 may be updated or modified based on the information stored in the SIR drop database 112, so that the trained machine learning circuitry 110 may identify, predict, or determine the presence and locations of SIR drop violations in new CTS layouts that have not been routed. In some embodiments, the machine learning circuitry 110 may receive training data 120 and may be trained based on the training data 120, and may store information in the SIR drop database 112 as a result of the training. For example, the machine learning circuitry 110 may generate, modify, or adjust a machine learning model stored in the SIR drop database 112 based on training of the machine learning circuitry 110 by the training data 120. For example, the machine learning model may be modified to predict SIR drop values and/or identify presence and locations of SIR drop violations based on a correspondence (e.g., a similarity or deviation) between known layout structures and positions of known SIR drop values or SIR drop violations.

In some embodiments, the training data 120 and/or the information stored in the SIR drop database 112 may be or include labeled training data from which the machine learning circuitry 110 and/or the SIR drop violation prediction circuitry 142 may learn to predict or determine the SIR drop values and the presence of SIR drop violations in a CTS layout (e.g., prior to routing of the CTS layout). The labeled training data may include labels associated with feature classes, and the labels may indicate any of a plurality of features or feature classes in the training data. Such features may include any features having characteristics or parameters associated with the CTS layout, and in some embodiments, may include SIR drop values or SIR drop violation information associated with any of the extracted features. For example, the features may include a number of clock cells, capacitance of cells, pin load of cells, frequency of cells, number of vdd vias on various layers in the CTS layout, or the like.

In some embodiments, the training data 120 may include manually-entered input, such as one or more variable or adjustable parameters, coefficient values, labels, classifiers, or the like, to adjust or otherwise manage the SIR drop model developed in the machine learning circuitry 110 and/or stored in the SIR drop database 112 through the training process.

Training may be based on a wide variety of learning algorithms or models, including, for example, support vector machines, linear regression, logistic regression, naive Bayes, linear discriminant analysis, decision trees, k-nearest neighbor, neural networks, or the like. An example of training of the machine learning circuitry 110 based on a neural network is provided previously herein.

In some embodiments, the machine learning circuitry 110 may implement or be trained based on a regression method with two-stage ensembles, as will be described in further detail herein, for example, with respect to FIG. 6. A regression method may be any regression analysis technique which may be used to estimate the relationships among variables, such as a relationship between the SIR drop values or SIR drop violations in a CTS layout and one or more features associated with the CTS layout which may be statistically related to the SIR drop values or the presence of SIR drop violations (e.g., a number of clock cells, capacitance of cells, pin load of cells, frequency of cells, number of vdd vias on various layers in the CTS layout, or the like).

In some embodiments, the machine learning circuitry 110 may generate, based on the training (e.g., based on training input including past data indicative of presence and location of SIR drop values and/or SIR drop violations in CTS layouts after routing has been performed), a plurality of processed regions which may be stored in a processed region database 114. The processed regions may represent CTS layout regions (e.g., grid structures having one or more grids or grid regions of a CTS layout) that are prone to SIR drop violations. In some embodiments, the processed regions represent grid cells or groupings of neighboring grid cells which exhibit SIR drop violations.

In some embodiments, the SIR drop violation prediction system 100 may include an SIR drop violation results database 116. The SIR drop violation prediction circuitry 142 and/or the machine learning circuitry 110 may predict or determine the presence of one or more SIR drop violations in a particular CTS layout or CTS layout region, for example, by analyzing or processing the CTS data with respect to one or more machine learning models which may be stored in the SIR drop database 112, the machine learning circuitry 110, and/or the processed region database 114. Results of the analysis, which may be results in the form of SIR drop values and/or locations of SIR drop violations in the CTS layout, may be stored in the SIR drop violation results database 116.

Referring again to FIG. 1, the clock tree cell adjustment tool 44 may adjust an analyzed CTS layout based on a predicted or determined presence of and/or location of SIR drop violations that would exist in the CTS layout after routing the CTS layout, e.g., by the routing tool 28. In some embodiments, the clock tree cell adjustment tool 44 may receive the locations of predicted or determined SIR drop violations from the SIR drop violation prediction tool 42, which may utilize or implement the SIR drop violation prediction system 100 shown in FIG. 2 to predict or determine the presence of and/or locations of SIR drop violations in the CTS layout.

The clock tree cell adjustment tool 44 may, for example, increase the spacing between clock cells in a region of the CTS layout in which one or more SIR drop violations were predicted or determined to be present, in order to remove or avoid the SIR drop violations.

Figure 3A:
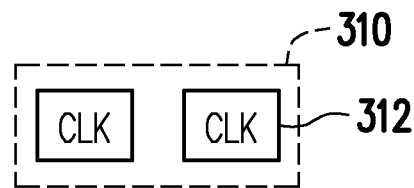
FIG. 3A is a schematic diagram illustrating a region of a clock-tree synthesis (CTS) layout in which one or more SIR drop violations are predicted or otherwise determined to be present, in accordance with some embodiments.

FIG. 3A is a schematic diagram illustrating a region 310 of a CTS layout in which one or more SIR drop violations were predicted or otherwise determined to be present. For example, the SIR drop removal platform 40 and/or the SIR drop violation prediction system 100 may analyze a CTS layout, and may predict or determine that one or more SIR drop violations would exist in the region 310 of the CTS layout if the placement layout were to proceed to routing, e.g., by the routing tool 28.

The region 310 may include any number of clock cells 312, which may be any type of clock cells, including, for example, integrated clock gating cells (ICGs). In the example shown in FIG. 3A, the region 310 includes two clock cells 312 which are positioned near one another in the horizontal direction. However, it should be appreciated that the regions of CTS layouts which may be analyzed by the SIR drop removal platform 40 and/or the SIR drop violation prediction system 100 may have various sizes and may include any number of clock cells which may be positioned with one or more grid units or grid cells. Moreover, while the clock cells 312 are shown as having a substantially same size, in various embodiments the clock cells 312 may have a variety of different sizes, with some cells being larger or smaller than other cells in the region 310. Additionally, although the clock cells 312 are shown in FIG. 3A as being rectangular in shape, embodiments of the present disclosure are not limited thereto, and in various embodiments, the clock cells 312 of a placement layout may have any suitable shape.

The clock cells 312 within the region 310 are closely positioned next to one another along the horizontal direction, which can result in SIR drop violations once the CTS placement is routed. In order to remove or avoid the predicted SIR drop violations that would exist in the region 310 if the CTS layout were to be routed, the clock tree cell adjustment tool 44 may increase the horizontal and/or vertical spacing between the clock cells 312, for example, as shown in FIGS. 3B and 3C.

Figure 3B:
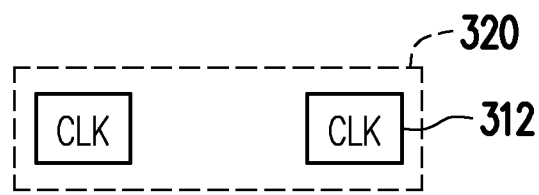
FIG. 3B is a schematic diagram illustrating a region in which a horizontal spacing between clock cells is increased in response to SIR drop violations being predicted or determined to be present, in accordance with some embodiments.

FIG. 3B is a schematic diagram illustrating a region 320 in which the same clock cells 312 of the region 310 shown in FIG. 3A are positioned, but with increased horizontal spacing between the clock cells 312. For example, as shown in FIG. 3B, the clock cells 312 may be positioned within the region 320, which may be a larger region of the CTS layout than the region 310 shown in FIG. 3A. That is, the size of the region 320 is increased with respect to the size of the region 310 in order to provide increased horizontal spacing between the clock cells 312 and thereby reduce or eliminate the likelihood of SIR drop violations from occurring in the region 320.

Figure 3C:
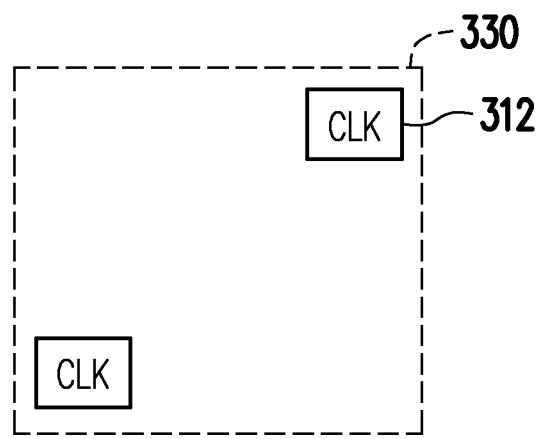
FIG. 3C is a schematic diagram illustrating a region in which a vertical spacing between clock cells is increased in response to SIR drop violations being predicted or determined to be present, in accordance with some embodiments.

FIG. 3C is a schematic diagram illustrating a region 330 in which the same clock cells 312 of the region 310 shown in FIG. 3A are positioned, but with increased vertical spacing between the cells clock 312. For example, as shown in FIG. 3C, the clock cells 312 may be positioned within the region 330, which may be a larger region of the CTS layout than the region 310 shown in FIG. 3A. For example, the region 330 may have a same horizontal dimension (e.g., width) as the region 310; however, the vertical dimension (e.g., height) of the region 330 is increased with respect to that of the region 310 in order to provide increased vertical spacing between the clock cells 312 and thereby reduce or eliminate the likelihood of SIR drop violations from occurring in the region 330. In various embodiments, one or both of the horizontal and vertical spacing between adjacent clock cells 312 may be increased to reduce or eliminate the likelihood of SIR drop violations from occurring in regions of the CTS layout.

In some embodiments, the clock tree cell adjustment tool 44 may itself adjust the CTS layout, for example, by increasing the spacing between clock cells 312 of a region that is predicted or determined to have one or more SIR drop violations. In other embodiments, the clock tree cell adjustment tool 44 may instruct or otherwise cause the electronic design platform 20 (e.g., the CTS tool 26) to increase the spacing between clock cells 312 of the CTS layout in order to avoid or eliminate the predicted or determined SIR drop violations. For example, in some embodiments, the clock tree cell adjustment tool 44 may increase spacing between clock cells 312 along one or both of an x-axis direction (e.g., horizontally, as shown in FIG. 3B) and a y-axis direction (e.g., vertically, as shown in FIG. 3C). The spacing between adjacent clock cells 312 may be increased by any factor, such as, for example, 0.5 times, 1 times, or 2 times, in various embodiments.

In some embodiments, the SIR drop removal platform 40 and/or the SIR drop violation prediction system 100 may provide feedback to the electronic design platform 20 (e.g., to the CTS tool 26) based on the predicted or determined SIR drop violations in a CTS layout. Such feedback may be utilized to optimize or otherwise improve a CTS recipe or CTS rules which may be utilized by the CTS tool 26 to generate or produce subsequent CTS layouts which are less likely to have SIR drop violations.

Figure 4:
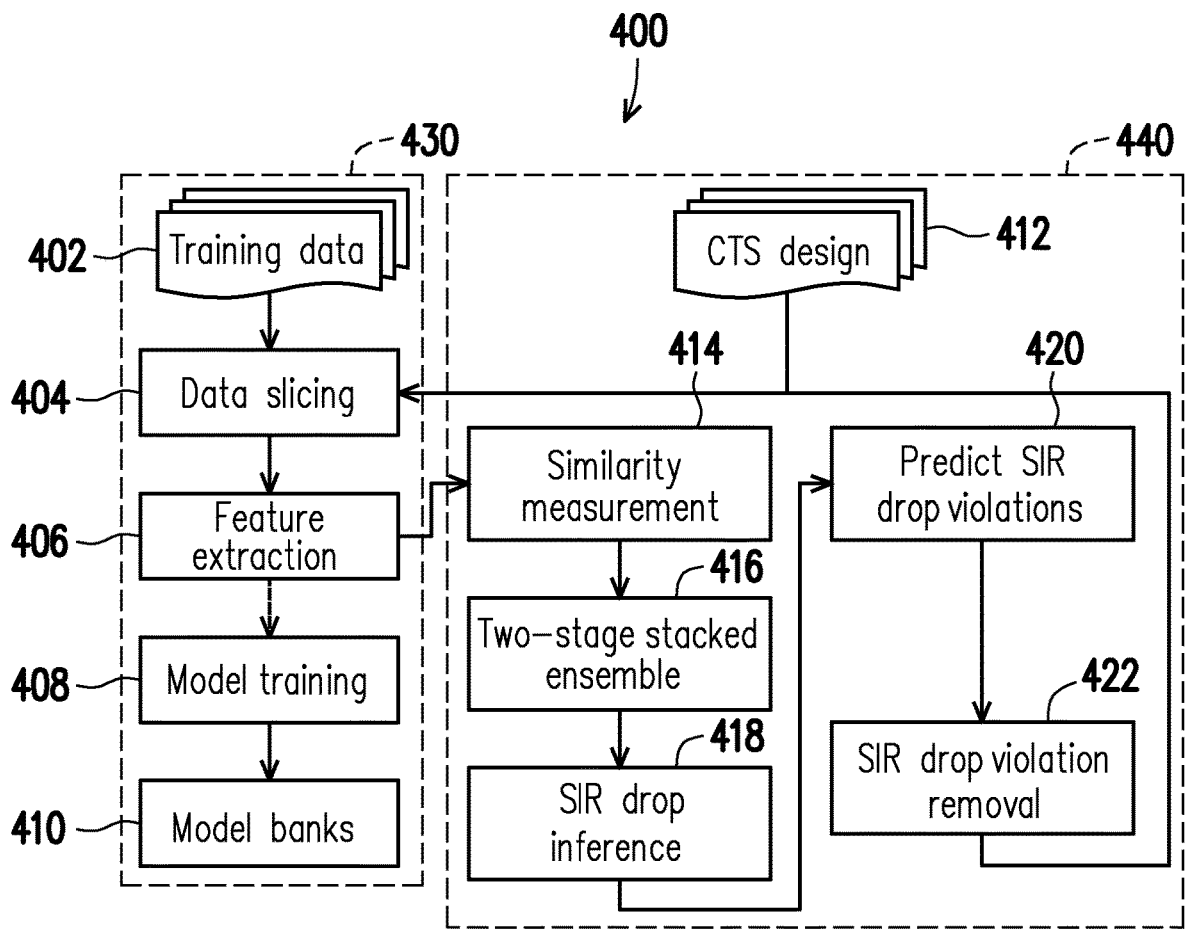
FIG. 4 is a flow chart illustrating an SIR drop violation removal method, in accordance with some embodiments.

FIG. 4 is a flow chart 400 illustrating an SIR drop violation removal method, in accordance with one or more embodiments. The SIR drop violation removal method may be implemented, for example, by the SIR drop removal platform 40 and/or the SIR drop violation prediction system 100 shown and described with respect to FIGS. 1 and 2.

The flowchart 400 includes a model training branch 430 and an SIR drop violation prediction branch 440. In the model training branch 430, training data representative of past data, including known SIR drop values or SIR drop violations in known electronic device designs may be utilized to train a machine learning model, such as a machine learning model implemented by the SIR drop violation prediction circuitry 142 and/or the machine learning circuitry 110 and which may be at least partially stored, for example, in the SIR drop database 112 and/or the processed region database 114. In the SIR drop violation prediction branch 440, new CTS layouts (e.g., as generated by the CTS tool 26) are analyzed (e.g., by the SIR drop violation prediction circuitry 142 and/or the machine learning circuitry 110) to predict or determine SIR drop values and locations of SIR drop violations in the CTS layout before routing is performed on the CTS layout. Additionally, removal of such SIR drop violations from the CTS layout may be performed in the SIR drop violation prediction branch 440.

At 402, the method includes receiving training data as part of the model training branch 430. The training data may be, for example, the training data 120 described previously herein, for example, with respect to FIG. 2. The training data may be received by the machine learning circuitry 110. For example, the training data 120 may be data representative of electronic device designs after routing has been performed and which indicates the presence and locations of SIR drop values or SIR drop violations in the electronic device designs.

At 404, data slicing is performed on the input training data. Data slicing may include any processing, translation, transformation or formatting of the training data to render the training data into a format suitable for use in training the machine learning model, such as the machine learning model implemented by the SIR drop violation prediction circuitry 142 and/or the machine learning circuitry 110 and which may be at least partially stored, for example, in the SIR drop database 112 and/or the processed region database 114. The data slicing at 414 may be performed by the SIR drop removal platform 40, for example, by the machine learning circuitry 110.

At 406, feature extraction is performed on the input training data after the data slicing has been performed at 404. In some embodiments, feature extraction may be performed by the machine learning circuitry 110. For example, the machine learning circuitry 110 may include a feature extraction tool which may be implemented to extract information associated with one or more features of the electronic device design represented by the training data. The extracted features may include any characteristics or parameters associated with the electronic device design. In some embodiments, the machine learning circuitry 110 analyzes a plurality of regions of the electronic device design and extracts features associated with each of the plurality of regions. For example, the machine learning circuitry 110 may perform feature extraction on each of a plurality of grid units of the electronic device design and/or on each of a plurality of neighboring grid units of the electronic device design.

Figure 5:
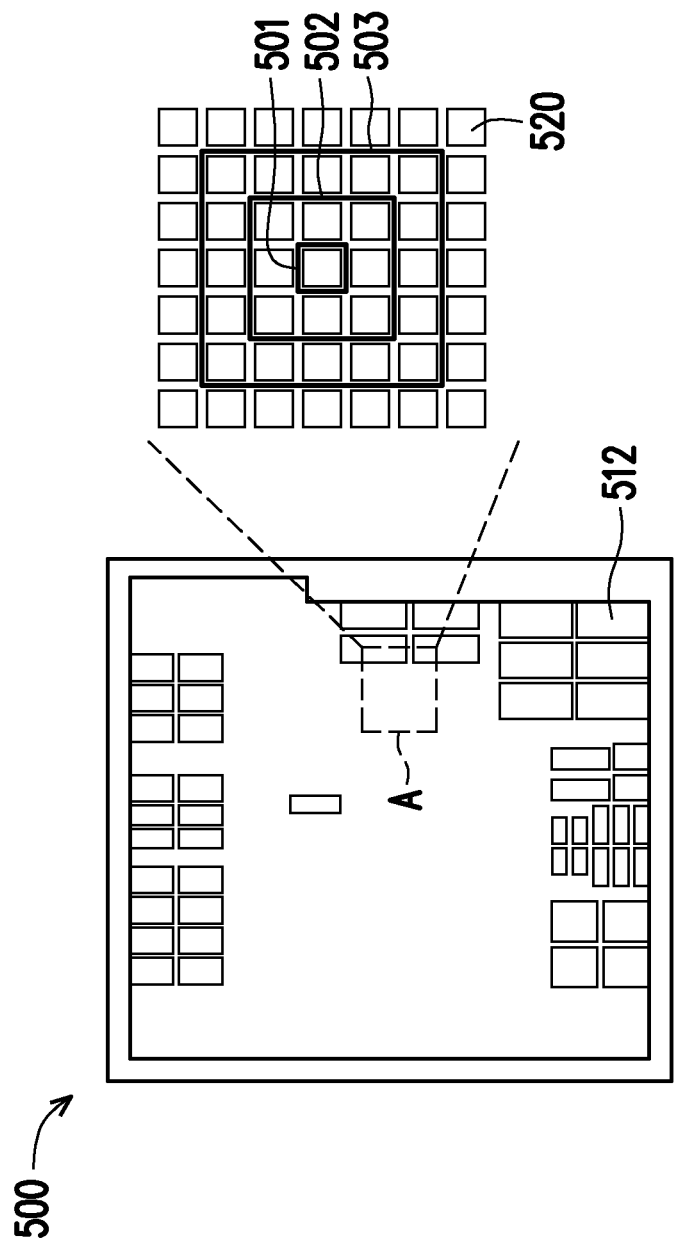
FIG. 5 is a diagram illustrating a portion of an example electronic device design, in accordance with some embodiments.

FIG. 5 is a diagram illustrating a portion of an example electronic device design 500, which may be produced by the electronic design platform 20, for example, after routing by the routing tool 28. In some embodiments, the electronic device design 500 may represent training data that is input to the machine learning circuitry 110 for training of the machine learning models, and the electronic device design 500 may include information associated with SIR drop values or SIR drop violations (e.g., the electronic device design 500 provided as training input may include an associated SIR drop map for the electronic device design 500). The electronic device design 500 includes a plurality of cells 512, which may include cells generated and placed by the placement tool 24 and may include clock cells generated by the CTS tool 26. In the example shown in FIG. 5, only some of the cells 512 that are included in the electronic device design 500 are illustrated, and it should be readily appreciated that additional cells 512 may be included in the electronic device design 500.

An enlarged region "A" of the electronic device design 500 is pictured in FIG. 5. As can be seen in the region "A", a grid may be overlaid on the electronic device layout 500, and the grid may include a plurality of grid units or grid cells 520.

The machine learning circuitry 110 may analyze and extract features from the electronic device design 500 on a region-by-region basis, and the regions may have any suitable size. For example, the machine learning circuitry 110 may extract features of each of a plurality of first regions 501 of the electronic device design 500, which may be the individual grid cells 520 of the electronic device design 500. In some embodiments, the machine learning circuitry 110 may extract features of each of a plurality of second regions 502 of the electronic device design 500, which may be 3×3 grid cell groupings or regions of the electronic device design 500. In some embodiments, the machine learning circuitry 110 may extract features of each of a plurality of third regions 503 of the electronic device design 500, which may be 5×5 grid cell groupings or regions of the electronic device design 500. It should be readily appreciated that any size of regions (e.g., any size of grid cell groupings or regions) may be analyzed by the machine learning circuitry 110 to extract features of the electronic device design 500. In some embodiments, the machine learning circuitry 110 may extract features from each of a particular set of regions, such as the first regions 501, and may further extract features from each of a particular set of second regions, such as the second regions 502, which surround the first regions 501. That is, the feature extraction may be performed on a variety of different window sizes or sizes of regions which are analyzed. This may allow the machine learning circuitry 110 to capture the influence of overlapping regions or neighboring regions on a particular region of interest, such as a particular grid cell or first region 501.

The features that are extracted may include any characteristics or parameters associated with the electronic device design, and in some embodiments, may include SIR drop values or SIR drop violation information associated with any of the extracted features. For example, the extracted features may include a number of clock cells, capacitance of cells, pin load of cells, frequency of cells, number of vdd vias on various layers in the electronic device design 500, or the like within each analyzed region (e.g., a first region 501, a second region 502 and/or a third region 503) of the electronic device design 500.

At 408, the extracted feature data is provided for model training. The model training may be performed, for example, by the SIR drop violation prediction circuitry 142 and/or the machine learning circuitry 110, and the extracted feature data may be used to train one or more models which may be at least partially stored, for example, in the SIR drop database 112 and/or the processed region database 114. In some embodiments, model training at 408 may include training a plurality of models which are stored in a model bank 410. The model bank 410 represents storage of a plurality of models, which may be stored as a model bank, for example, in the SIR drop database 112 and/or the processed region database 114. The model bank 410 may store a plurality of machine learning models utilized to predict or determine SIR drop values and locations of SIR drop violations in a CTS layout. In some embodiments, the model bank includes models indicative of SIR drop values or SIR drop violations in one or more regions or sub-regions (e.g., a single grid cell or a grouping of neighboring grid cells) of a CTS layout and/or of an electronic device design.

Each of the machine learning models in the model bank 410 may be trained using principal component analysis (PCA). PCA is a known statistical technique that uses an orthogonal transformation to convert a set of observations of possibly correlated variables (e.g., the extracted features and SIR drop values or SIR drop violations) into a set of values of linearly uncorrelated variables called principal components. A feature space for each of the models in the model bank 410 may be generated using any conventional technique, such as PCA. The feature space may be a multi-dimensional feature space which correlates (e.g., by a plot) all of the extracted features with one another and/or with SIR drop values or SIR drop violations. For example, for each of the models, the extracted features may be represented as interdependent variables along respective axes of a multi-dimensional feature space. Each of the models may further include a covariance matrix which represents the spread (or level of correlations) of the extracted features in the multi-dimensional feature space. As is well known in the relevant field, such a covariance matrix may have associated eigenvectors and eigenvalues which define a shape and orientation of the feature data (e.g., the data points in the feature space). Each of the plurality of models stored in the model bank 410 may thus include the feature space and the associated eigenvectors and eigenvalues which define shape and orientation of the feature space.

The model bank 410 may be implemented by the SIR drop violation prediction circuitry 142 and/or the machine learning circuitry 110 to predict or determine SIR drop values and SIR drop violations for a particular CTS layout, for example, before routing is performed.

For example, once the models in the model bank 410 have been sufficiently trained, new CTS layouts (e.g., CTS layouts) may be provided to the SIR drop violation prediction branch 440 and may be analyzed with respect to the models in the model bank 410 to predict or determine SIR drop values and locations of SIR drop violations, as will be described in further detail below At 412, a CTS layout is provided to the SIR drop violation prediction branch 440 of the flowchart 400. The CTS layout may be a new CTS layout generated, for example, by the CTS tool 26 of the electronic design platform 20.

Data slicing and feature extraction is performed on the CTS layout, which is represented at 404 and 406. Data slicing and feature extraction may include some or all of the features or functionalities described herein with respect to data slicing at 404 and feature extraction at 406 previously described herein with respect to the model training branch 430. For example, the feature extraction may be performed based on one or more first regions 501, second regions 502, and/or third regions 503 as shown and described with respect to FIG. 5. The features extracted may include any characteristics or parameters associated with the CTS layout, including, for example, a number of clock cells, capacitance of cells, pin load of cells, frequency of cells, number of vdd vias on various layers in the electronic device design 500, or the like within each analyzed region (e.g., a first region 501, a second region 502 and/or a third region 503) of the CTS layout.

At 414, the extracted features of the CTS layout are utilized for perform similarity measurements. Similarity measurements at 414 may be performed by comparing the extracted features of the CTS layout with features associated with each of the plurality of models in the model bank 410. As will be described in further detail below with respect to FIG. 6, the results of the similarity measurement at 414 may be utilized to select or generate a two-stage stacked ensemble at 416, which is utilized to predict or determine SIR drop values for the CTS layout.

Figure 6:
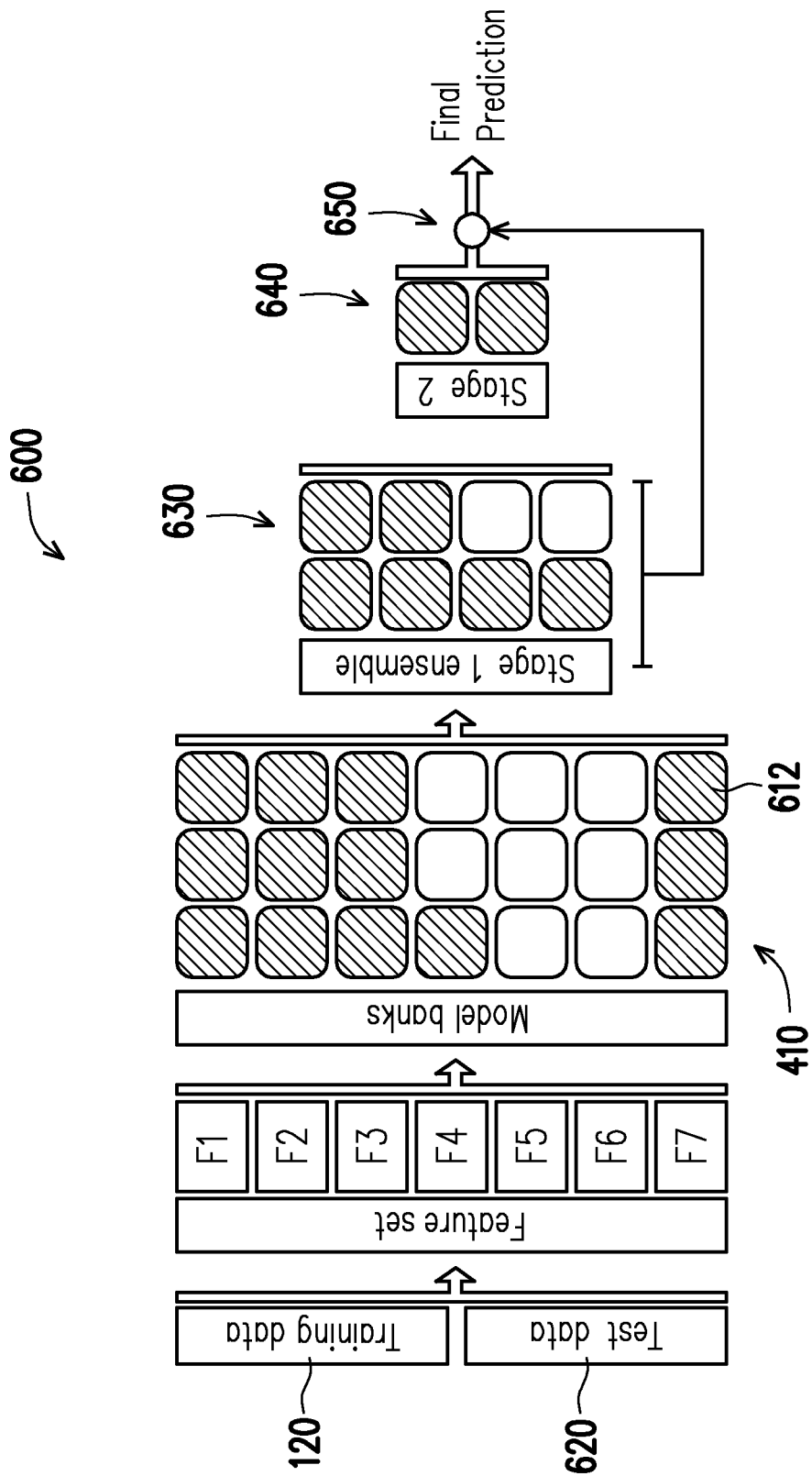
FIG. 6 is a diagram illustrating a two-stage stacked modeling method for predicting or determining SIR drop values for a CTS layout, in accordance with one or more embodiments.

Referring now to FIG. 6, illustrated therein is a diagram 600 illustrating a two-stage stacked modeling method for predicting or determining SIR drop values for a CTS layout, in accordance with one or more embodiments. The method illustrated by the diagram 600 may be performed, for example, at blocks 414 and 416 of the flow chart 400 illustrated in FIG. 4.

For example, the method illustrated by the diagram 600 may be utilized to perform first similarity measurements by comparing extracted features of a CTS layout with features associated with each of a plurality of models in the model bank. The first similarity measurements may be used to select a plurality of the models in the model bank to form a first stage ensemble, and second similarity measurements may be performed based on a comparison of the extracted features of the CTS layout with the models selected for the first stage ensemble. The second similarity measurements may be used to select one or more of the models in the first stage ensemble, which are used in a second stage ensemble to predict or determine SIR drop values for the CTS layout.

As shown in FIG. 6, training data 120 may be input, for example, to the machine learning circuitry 110. As previously described, for example with respect to FIG. 2, the training data 120 may be data representative of electronic device designs after routing has been performed and which indicates the presence and locations of SIR drop values or SIR drop violations in the electronic device designs. This is also represented at 402 of FIG. 4. A feature set for each input training data 120 is extracted, which is also represented at 404 of FIG. 4. The features (F1 through F7 as shown in FIG. 6) may include any characteristics or parameters associated with the electronic device design. For example, the features may include a number of clock cells, capacitance of cells, pin load of cells, frequency of cells, number of vdd vias on various layers in the electronic device design, or the like. The extracted feature data or feature set is used for model training, as explained at block 408 of FIG. 4. More particularly, as shown in FIG. 6, the extracted feature sets from the training data 120 is used to train each of a plurality of machine learning models 612 stored in the model bank 410. A plurality of different types of machine learning models 612 may be stored in the model bank 410. The different types of machine learning models 612 may be, for example, machine learning models for different types of electronic device designs. Such types of electronic device designs may include, for example, high performance computing (HPC) device designs, graphical processing unit (GPU) device designs, high-end mobile communications device designs, mid-end mobile communication device designs, Internet of Things (IoT) device designs, or the like. Accordingly, each particular machine learning model 412 may be trained based on past data (e.g., electronic device designs after routing has been performed and which indicates the presence and locations of SIR drop values or SIR drop violations in the electronic device designs) associated with a particular type of electronic device design (e.g., HPC, GPU, high-end or low-end mobile communication, or IoT device designs).

Once trained, for example, by the training data 120, each of the machine learning models 612 is capable of predicting or determining SIR drop values and locations of SIR drop violations in a CTS layout. Prediction accuracy may be increased, however, by utilizing the two-stage stacked modeling illustrated in FIG. 6. For example, when a new CTS layout 620 is received (for example, at 412 of FIG. 4), and feature extraction is performed (for example, at 406 of FIG. 4), the received CTS layout 620 (e.g., the extracted feature data of the CTS layout 620) may be compared or processed by each of the plurality of machine learning models 612 in the model bank 410. For example, in some embodiments, the received CTS layout 620 is compared with each of the plurality of machine learning models 612 in the model bank 410 and a first stage ensemble is selected based on the comparison. For example, the first stage ensemble may include a predefined number of the machine learning models 612 which is less than the total number of machine learning models 612. In the example shown in FIG. 6, the first stage ensemble includes eight machine learning models 612, which may be selected by the machine learning circuitry 110 based on the comparison with the received CTS layout 620. For example, the eight machine learning models 612 selected for the first stage ensemble 630 may be the closest matches to the received CTS layout 620. In some embodiments, the selection of the models for the first stage ensemble 630 is based on a comparison of characteristics of the feature space of the received CTS layout 620 with those of each of the plurality of machine learning models 612 in the model bank 410. In some embodiments, the first stage ensemble 630 is selected based on both the shape and the orientation of the feature space, as defined, for example, by the covariance matrix produced by principal component analysis (PCA).

In some embodiments, a second stage ensemble 640 is generated based on the results of a second comparison between the received CTS layout 620 and the machine learning models 612 selected for the first stage ensemble 630. The characteristics that are compared during the second comparison may be different from the first comparison. For example, in some embodiments, the second stage ensemble 640 is selected by comparing only the orientation of the feature space of the received CTS layout 620 with the orientation of the feature space of the machine learning models 612 in the first stage ensemble 630. The second stage ensemble 640 may be selected to include one or more machine learning models 612 from the first stage ensemble 630. In the example shown in FIG. 6, the second stage ensemble 640 includes just two of the machine learning models 612 from the first stage ensemble 630, which represent the two models having the closest match to the received CTS layout 620 in terms of orientation of the feature space.

At 650, a final prediction is made regarding SIR drops in the received CTS layout 620. The final prediction may be produced, for example, by the machine learning circuitry 110. The final prediction may be a predicted SIR drop map, which represents values and locations of the SIR drops across the entire CTS layout 620. In some embodiments, the final prediction is made at 650 by combining the selected machine learning models of the second stage ensemble 640.

In some embodiments, tail models are included in the model bank 410 to amplify the predicted SIR drop values, particularly at the regions of the CTS layout 620 where the SIR drop values are predicted to be high, e.g., close to a threshold value at which the predicted SIR drop values are indicative of SIR drop violations (e.g., where the predicted SIR drop values are near a value which exceed specified design ranges for SIR voltage drops). For example, in some embodiments, each of the machine learning models 612 in the model bank 410 may include both a baseline model and an associated tail model which amplifies the predicted SIR drops at the tail of the baseline model by increasing or otherwise emphasizing the effects of predicted SIR drop values that are close to a threshold value. The tail model may therefore be combined with the baseline model in each of the machine learning models 612, such that the machine learning models 612 may generate results, when compared with received CTS layouts 620, which provide greater weights to predicted SIR drops that are at the higher end of the distribution (e.g., a histogram) of SIR drops for the CTS layouts 620. In various embodiments, the threshold value which represents a maximum permissible SIR drop value for a particular CTS layout may have any desired value for the particular CTS layout. In some embodiments, the threshold is provided in the form of a ratio. For example, the threshold may be set as a ratio of the predicted SIR drop value to the predicted value of the voltage applied at locations of the CTS layout. The threshold ratio may have any value, and in some embodiments, the threshold ratio may be set to about 10%. In such embodiments, SIR drop values which are greater than 10% of the applied voltage at particular locations of the CTS layout may be determined to be SIR drop violations.

Referring now to FIG. 4, the final prediction 650 (FIG. 6) resulting from the two stage ensemble analysis with respect to the received CTS layout is output as an SIR drop inference at 418. For example, the SIR drop inference at 418 may be the predicted SIR drop distribution or map that is generated by the machine learning circuitry as the final prediction 650. The predicted SIR drop distribution or map may be generated with respect to each analyzed region (e.g., for each grid cell or for each of a plurality of groupings of grid cells), or in some embodiments, the predicted SIR drop distribution or map may be generated for the entire CTS layout.

At 420, positions of SIR drop violations are predicted. The SIR drop violations may be any SIR drops which exceed a threshold SIR drop value, and the threshold SIR drop value may represent, for example, a maximum threshold SIR drop value that is permissible for a particular electronic device design and may be set based on design specifications for the electronic device design. Predicting the positions of SIR drop violations at 420 may include analyzing the generated predicted SIR drop distribution or map for SIR drop values that exceed the SIR drop threshold value.

At 422, SIR drop violation removal is performed to remove the predicted SIR drop violations from the CTS layout, prior to routing of the CTS layout. The SIR drop violations may be removed, for example, by increase the spacing between clock cells in a region of the CTS layout in which one or more SIR drop violations were predicted or determined to be present, as described previously herein with respect to FIGS. 3A to 3C. Removal of SIR drop violations at 422 may be performed, for example, by the clock tree cell adjustment tool 44.

In some embodiments, after the SIR drop violations have been removed at 422, the CTS layout may proceed to data slicing and feature extraction at 404 and 406, and may again be processed by the SIR drop violation prediction branch 440 of the flowchart 400. This process may repeat until all of the predicted SIR drop violations have been removed from the CTS layout, at which point, the CTS layout may proceed to routing. For example, the CTS layout may be provided from the SIR drop removal platform 40 to the electronic design platform 20 where it may be routed, for example, by the routing tool 28, verified by the verification tool 30, and may be physically manufactured as a completed electronic device design.

Figure 7A:
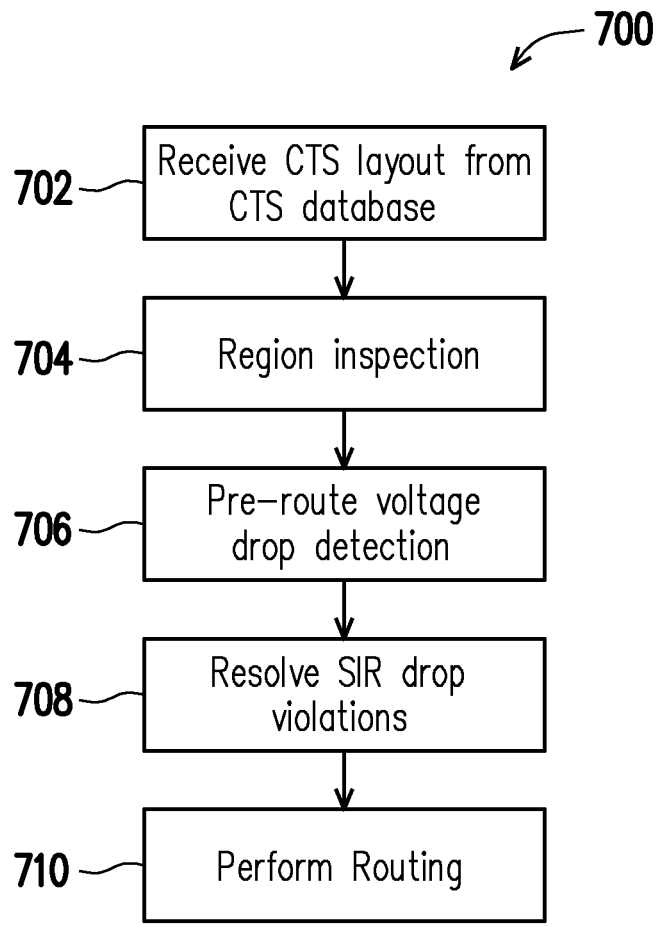
FIG. 7A is a flowchart illustrating an SIR drop violation prediction method, in accordance with one or more embodiments

FIG. 7A is a flowchart 700 illustrating an SIR drop violation prediction method, in accordance with one or more embodiments. The SIR drop violation prediction method may be implemented at least in part, for example, by the SIR drop removal platform 40 shown in and described with respect to FIG. 1 and/or by the SIR drop violation prediction system 100 shown in and described with respect to FIG. 2.

At 702, CTS data associated with a CTS layout is received from a CTS database, such as the CTS database 102 of the SIR drop violation prediction system 100. The CTS data may be received, for example, by the SIR drop violation prediction circuitry 142, and the CTS data may be associated with a particular CTS layout generated, for example, by the CTS tool 26 of the electronic design platform 20.

At 704, regions of the CTS layout are inspected, for example, by the SIR drop violation prediction circuitry 142. The inspected regions of the CTS layout may have any size, and in some embodiments, the inspected regions may include a single grid cell, or a plurality of grid cells, which may be referred to as a grid region. Each grid region of the CTS layout may be inspected separately, region-by-region, at 704.

At 706, pre-routing SIR drop detection is performed. The SIR drop detection performed at 706 may include predicting or determining, for example, by the SIR drop violation prediction circuitry 142 and/or the machine learning circuitry 110 whether one or more SIR drop violations would be present in any of the inspected grid regions of the CTS layout should the CTS layout proceed to be routed, for example, by the routing tool 28.

At 708, SIR drop violations are resolved or removed in response to one or more SIR drop violations being predicted to be present at 706. Removal of the predicted SIR drop violations may be performed, for example, by the clock tree cell adjustment tool 44, which may remove or avoid the predicted SIR drop violations that would exist in the CTS layout by increasing spacing between one or more clock cells in the CTS layout.

At 710, routing of the CTS layout is performed, for example, by the routing tool 28. The routing is performed after the predicted SIR drop violations are removed at 708, so that SIR drop violations will be reduced or eliminated in the CTS layout after routing is performed.

Figure 7B:
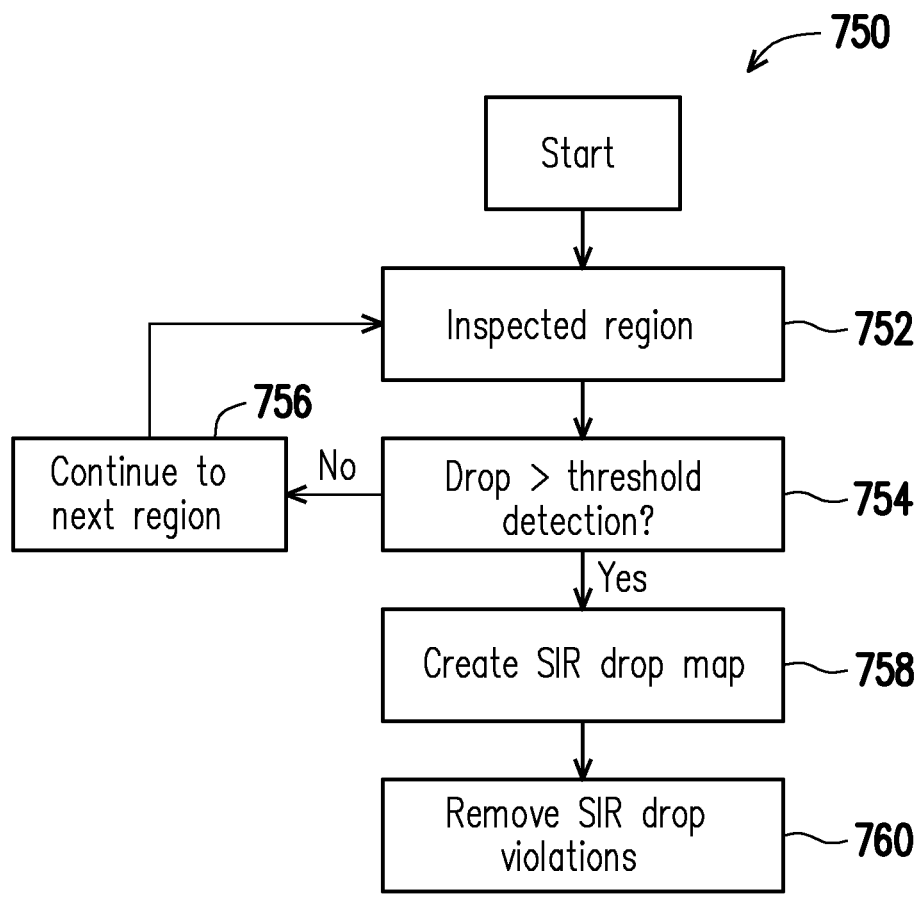
FIG. 7B is a flowchart illustrating further details of the region inspection and the pre-route SIR drop detection of the flowchart of FIG. 7A, in accordance with some embodiments.

FIG. 7B is a flowchart 750 illustrating further details of the region inspection (704) and the pre-route SIR drop detection (706) of the flowchart 700 of FIG. 7A.

At 752, a particular region of the CTS layout is inspected, for example, by the SIR drop violation prediction circuitry 142 and/or the machine learning circuitry 110. Inspection of regions of the CTS layout at 752 may include, for example, utilizing the two-stage stacked modeling illustrated in FIG. 6 to generate a final result 650 which may represent a SIR drop distribution or map for the inspected region.

At 754, the SIR drop violation prediction circuitry 142 and/or the machine learning circuitry 110 predicts or determines whether one or more SIR drop violations would exist in the inspected region due to routing, before routing is performed on the CTS layout. Prediction of SIR drop violations at 754 may include comparing the predicted SIR drop values for the inspected region (as provided, for example, by the SIR drop distribution or map) with a threshold value. The threshold value may represent a maximum permissible SIR drop value for the CTS layout, which may be prescribed, for example, by design specifications for the electronic device design to be manufactured based on the CTS layout.

At 756, if no SIR drop violations are predicted to be present in the inspected region, which may be determined if the predicted SIR drop values do not exceed the threshold SIR drop value, then the flowchart continues to a next region of the CTS layout, and the flowchart returns to 752 and 754 in which the next region of the CTS layout is inspected, for example, by the SIR drop violation prediction circuitry 142 and/or the machine learning circuitry 110. If none of the regions of the CTS layout are predicted to have SIR drop violations (e.g., which are predicted to result due to a subsequent routing process), then the CTS layout may pass the inspection, in which case, the CTS layout may proceed to physical design and/or may proceed to physical routing of the particular electronic device design.

On the other hand, if one or more SIR drop violations are predicted to be present in the inspected region, then a SIR drop map is generated at 758. A SIR drop map may be generated for each inspected region which is predicted or determined to have one or more SIR drop violations. The SIR drop map may be generated, for example, by the SIR drop violation prediction circuitry 142 and/or the machine learning circuitry 110 utilizing any suitable technique, including, for example, utilizing a two-stage ensemble technique to compare feature space shape and/or orientation of the CTS layout with those of a plurality of machine learning models in a model bank as previously described herein. In some embodiments, the SIR drop map may be generated prior to, or as part of, the prediction or determination of SIR drop violations in an inspected region at 754.

At 760, the predicted or determined SIR drop violations are removed from the CTS layout. Removal of the SIR drop violations may be performed by the clock tree cell adjustment tool 44, which may remove or avoid the predicted SIR drop violations that would exist in the CTS layout by increasing spacing between one or more clock cells in the CTS layout.

Embodiments of the present disclosure provide several advantages. For example, embodiments of the disclosure are operable to determine whether SIR drop violations are present before routing of a CTS layout, which facilitates prediction of the presence of, as well as identification of predicted locations of, SIR drop violations at an early stage. This provides a significant advantage over conventional systems in which SIR drop violations due to routing are determined only after routing has been performed.

Embodiments of the present disclosure further facilitate significant improvements in design implementation turn-around time, since SIR drop violations may be predicted, and reduced or eliminated, prior to routing of the placement layout. This also results in significant reductions in a number of SIR drop violations, since such SIR drop violations may be predicted and reduced or eliminated prior to routing the CTS layout.

The present disclosure provides, in various embodiments, systems and methods that may be utilized to predict static voltage (SIR) drop violations that would be present due to routing a clock-tree synthesis (CTS) layout, before routing is performed on the CTS layout. This results in cost savings, since the yield of an electronic device may be increased due to reductions in SIR drop violations which can be predicted and then reduced or eliminated. Accordingly, the manufactured electronic devices will have fewer SIR drop violations, thereby increasing yield and reducing waste. Additionally, time savings are facilitated by embodiments of the present disclosure, since SIR drop violations in electronic device designs may be predicted prior to performing routing of the placement layout.

According to one embodiment, a static voltage (SIR) drop violation prediction system includes SIR drop violation prediction circuitry. The SIR drop violation prediction circuitry, when in use, receives clock-tree synthesis (CTS) layout data associated with a CTS layout. The SIR drop violation prediction circuitry may receive the CTS layout data, for example, from a CTS layout database or from a CTS tool of an electronic design platform. The SIR drop violation prediction circuitry inspects the CTS layout data associated with the CTS layout. The CTS data may include data associated with a plurality of regions of the CTS layout, and the SIR drop violation prediction circuitry may inspect each region of the CTS layout on a region-by-region basis. Additionally, the SIR drop violation prediction circuitry, when in use, predicts whether one or more SIR drop violations would be present in the CTS layout due to a subsequent routing of the CTS layout.

According to another embodiment, a method is provided that includes receiving, by static voltage (SIR) drop violation prediction circuitry, CTS layout data associated with a CTS layout of a semiconductor circuit design. CTS layout data associated with each of a plurality of regions of the CTS layout is inspected by the SIR drop violation prediction circuitry. For each of the plurality of regions, the SIR drop violation prediction circuitry predicts whether one or more SIR drop violations would be present due to routing of the CTS layout. The method further includes routing the CTS layout in response to predicting that no SIR drop violations would be present due to routing of the CTS layout.

According to yet another embodiment, a method is provided that includes training a plurality of machine learning models with information indicative of static voltage (SIR) drop violations in a plurality of electronic device designs. The plurality of machine learning models is stored in a database. The method further includes receiving, by SIR drop violation prediction circuitry, clock-tree synthesis (CTS) data associated with a CTS layout, and comparing the CTS data associated with the CTS layout with the plurality of routing machine learning models stored in the database. The SIR drop violation prediction circuitry predicts whether one or more SIR drop violations would be present in the CTS layout due to a subsequent routing of the CTS layout, based on the comparing the CTS data associated with the CTS layout with the plurality of machine learning models.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A violation prediction system, comprising:
   machine learning circuitry trained based on past data to predict the presence of violations in electronic device designs after routing has been performed, the machine learning circuitry configured to:
   predict, based on the past data and a pre-routing layout of an electronic device design, whether one or more violations would be present in in the electronic device design due to routing of the pre-routing layout.

2. The system of claim 1, further comprising:
   a clock-tree synthesis (CTS) database configured to store CTS layout data associated with a CTS layout, the CTS layout being the pre-routing layout.

3. The system of claim 2, further comprising:
   a processed region database configured to store information associated with a plurality of CTS regions which exhibit static voltage (SIR) drop violations, wherein the machine learning circuitry is configured to predict whether one or more SIR drop violations would be present in the CTS layout based at least in part on the information associated with the plurality of CTS regions which exhibit SIR drop violations.

4. The system of claim 3, further comprising:
a SIR drop database configured to store information associating SIR drop violations with at least one of a CTS layout or a CTS layout region,
wherein the machine learning circuitry is communicatively coupled to the SIR drop database, and the machine learning circuitry is configured to generate the information associated with the plurality of CTS regions which exhibit SIR drop violations based on the information stored in the SIR drop database.

5. The system of claim 1, wherein the machine learning circuitry is configured to:
generate a static voltage (SIR) drop violation map indicating locations of predicted SIR drop violations in the pre-routing layout.

6. The system of claim 1, further comprising:
a model bank which stores a plurality of machine learning models,
wherein the machine learning circuitry is communicatively coupled to the model bank, and the machine learning circuitry is configured to:
generate a first stage ensemble by selecting a first portion of the plurality of machine learning models based on a first similarity comparison between the pre-routing layout and the plurality of machine learning models; and
generate a second stage ensemble by selecting a second portion of the plurality of machine learning models based on a second similarity comparison between the pre-routing layout and the first portion of the plurality of machine learning models of the first stage ensemble.

7. The system of claim 6 wherein the machine learning circuitry is configured to generate a static voltage (SIR) drop map based on a comparison of the pre-routing layout with the second stage ensemble, the SIR drop map indicating predicted SIR drop values in the pre-routing layout.

8. The system of claim 7 wherein the machine learning circuitry is configured to compare the predicted SIR drop values with a threshold SIR drop value and predict whether one or more SIR drop violations would be present in the pre-routing layout due to routing of the pre-routing layout based on the comparison of the predicted SIR drop values with the threshold SIR drop value.

9. The system of claim 1, further comprising:
clock tree cell adjustment circuitry configured to increase a spacing between clock cells of a region of the pre-routing layout, in response to the machine learning circuitry predicting that one or more static voltage (SIR) drop violations would be present in the region of the pre-routing layout due to the routing of the pre-routing layout.

10. A method, comprising:
receiving, by machine learning circuitry trained based on past data to predict the presence of static voltage (SIR) drop violations in electronic device designs after routing has been performed, layout data associated with a layout of a semiconductor device; and
predicting, by the machine learning circuitry and based on the past data, whether one or more SIR drop violations would be present in the layout due to routing of the layout.

11. The method of claim 10, further comprising:
routing the layout in response to predicting that no SIR drop violations would be present in the layout due to routing of the layout.

12. The method of claim 10, further comprising:
generating a SIR drop violation map indicating locations of predicted SIR drop violations in the layout.

13. The method of claim 12 wherein the predicting whether one or more SIR drop violations would be present in the layout due to routing of the layout includes:
comparing the predicted SIR drop values with a threshold SIR drop value; and
predicting that one or more SIR drop violations would be present in response to one or more of the predicted SIR drop values exceeding the threshold SIR drop value.

14. The method of claim 10, further comprising:
selecting a first portion of a plurality of machine learning models based on a first similarity comparison between the layout and the plurality of machine learning models;
selecting a second portion of the plurality of machine learning models based on a second similarity comparison between the layout and the first portion of the plurality of machine learning models; and
generating a SIR drop map based on a comparison of the layout with the selected second portion of the plurality of machine learning models.

15. The method of claim 10, further comprising:
adjusting the layout by increasing a spacing between clock cells of at least one region of the layout, in response to the machine learning circuitry predicting that one or more SIR drop violations would be present in the at least one region of the layout due to routing of the layout.

16. A method comprising:
training machine learning circuitry based on past data associated with electronic device designs after routing has been performed; and
predicting, by the machine learning circuitry, presence of violations associated with an electronic device design based on a pre-routing layout of the electronic device design and the past data.

17. The method of claim 16 wherein the training the machine learning circuitry includes extracting feature information associated with the plurality of electronic device designs.

18. The method of claim 17, further comprising:
extracting feature information associated with the pre-routing layout for each of a plurality of regions of the pre-routing layout,
wherein the predicting whether one or more violations would be present in the pre-routing layout includes comparing the extracted feature information associated with the pre-routing layout with the extracted feature information associated with the plurality of electronic device designs.

19. The method of claim 16, further comprising:
generating a first stage ensemble by selecting a first portion of a plurality of machine learning models based on a first similarity comparison between the pre-routing layout and the plurality of machine learning models; and
generating a second stage ensemble by selecting a second portion of the plurality of machine learning models based on a second similarity comparison between the pre-routing layout and the first portion of the plurality of machine learning models of the first stage ensemble,
wherein the predicting whether one or more static voltage (SIR) drop violations would be present in the pre-routing layout is based on the first similarity comparison and the second similarity comparison.

20. The method of claim 16, further comprising:
adjusting the pre-routing layout by increasing a spacing between clock cells of the pre-routing layout, in response to predicting that one or more static voltage (SIR) drop violations would be present in the pre-routing layout; and
routing the adjusted layout.

* * * * *